United States Patent [19]

Feustle

[11] Patent Number: 5,565,892
[45] Date of Patent: Oct. 15, 1996

[54] DISPLAY AND DATA ENTRY DEVICE AND METHOD FOR MANUFACTURING THE SAME

[75] Inventor: Gerhard H. Feustle, Augsburg, Germany

[73] Assignee: NCR Corporation, Dayton, Ohio

[21] Appl. No.: 981,445

[22] Filed: Nov. 25, 1992

[30] Foreign Application Priority Data

Dec. 24, 1991 [GB] United Kingdom ............... 9127403

[51] Int. Cl.⁶ ................................................. G09G 5/00
[52] U.S. Cl. ........................... 345/173; 445/24; 385/120; 156/197; 156/291
[58] Field of Search .................................. 340/784, 706, 340/712; 178/18, 19; 313/495; 345/87, 104, 156, 173, 179, 176, 180–182, 177; 445/22, 24; 156/197, 196, 267, 292, 291; 359/42, 46, 74; 385/115, 120, 91, 90, 95

[56] References Cited

U.S. PATENT DOCUMENTS

| | | | |
|---|---|---|---|
| 3,922,577 | 11/1975 | Arthuber | 313/495 |
| 4,253,737 | 3/1981 | Thomsen et al. | 350/276 R |
| 4,295,712 | 10/1981 | Ishiwatari . | |
| 4,575,765 | 3/1986 | Hirt | 340/781 |
| 4,577,133 | 3/1986 | Wilson | 445/24 |
| 4,654,648 | 3/1987 | Herrington et al. | 345/179 |
| 4,764,139 | 8/1988 | Murata et al. | 445/49 |
| 4,814,760 | 3/1989 | Johnston et al. | 340/784 |
| 4,872,000 | 10/1989 | Kano et al. | 345/180 |
| 4,896,149 | 1/1990 | Buzak et al. | 340/771 |
| 5,123,074 | 6/1992 | Yokota et al. | 385/95 |
| 5,131,065 | 7/1992 | Briggs et al. | 345/76 |
| 5,221,979 | 6/1993 | Kim | 359/54 |
| 5,244,427 | 9/1993 | Umeya | 445/24 |

FOREIGN PATENT DOCUMENTS

| | | |
|---|---|---|
| 0092048 | 10/1983 | European Pat. Off. . |
| 0284848 | 10/1988 | European Pat. Off. . |
| 0349322 | 1/1990 | European Pat. Off. . |
| 2556113 | 7/1985 | France . |
| WO9014943 | 12/1990 | WIPO ................ 156/292 |

OTHER PUBLICATIONS

JP 63–026 721 A. In: Patent Abstracts of Japan, p. 725, vol. 12, Jul. 1988, No. 235.
JP 60–044 339 A. In: Derwent World Patents Index, AN 85–096 266/16 Mar. 1985.

Primary Examiner—Richard Hjerpe
Assistant Examiner—Lun-Yi Lao
Attorney, Agent, or Firm—Douglas S. Foote

[57] ABSTRACT

A display device including a dot matrix type LCD display, and a digitizing tablet for interpreting movement of a stylus across the display device. Aligned with the display in a viewing direction is disposed a light transmissive panel including a structure having a plurality of light transmissive regions containing a gaseous substance, e.g. air. The regions are in register with the dot matrix generation of the LCD display. The walls of the regions may be coated with reflective material to increase their reflective properties. The structure is sealed at its open ends with sheets of transparent material to form the panel, which provides a writing surface for the stylus. Two methods of manufacturing the panel are disclosed. The display device is light in weight, low in cost and parallax errors are minimized.

2 Claims, 3 Drawing Sheets

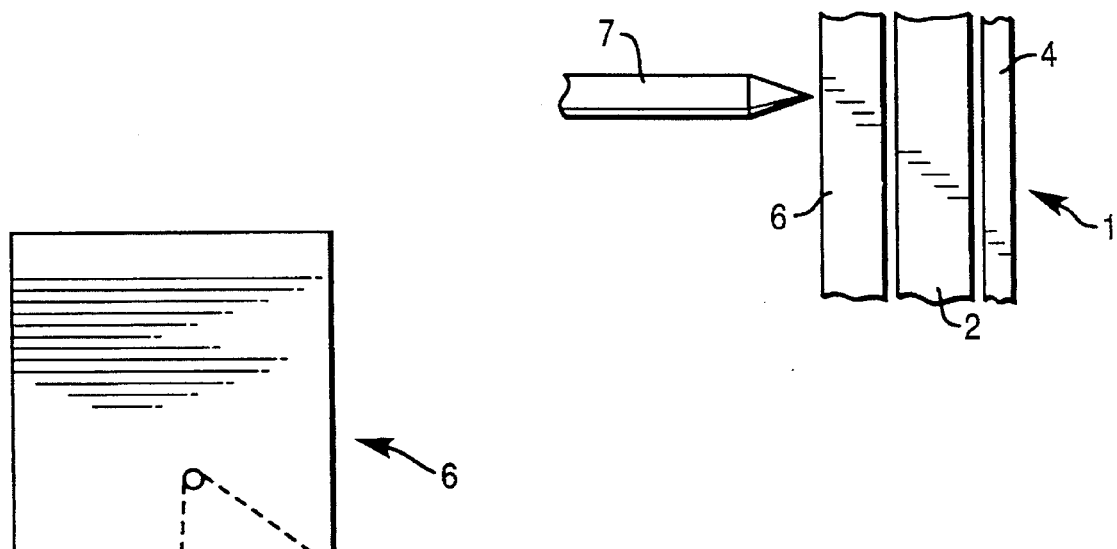
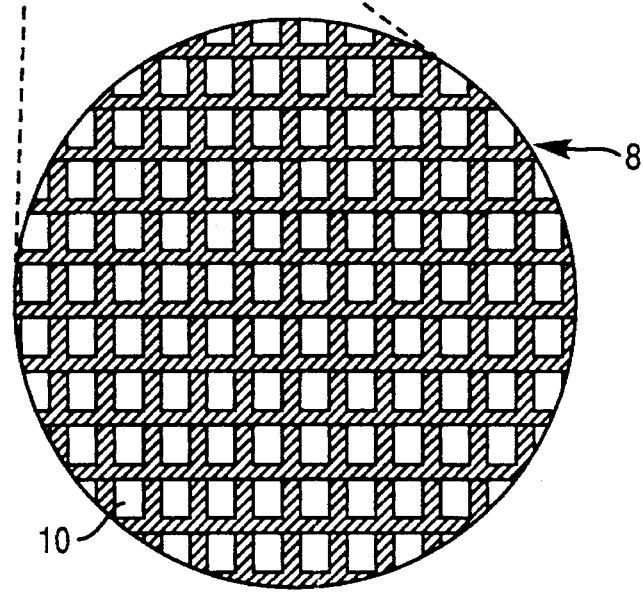
FIG. 3A

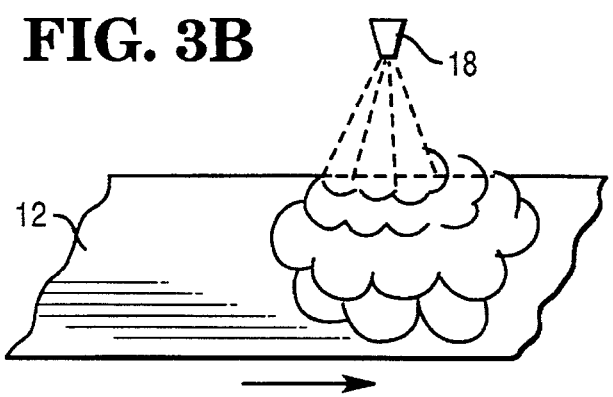
FIG. 3B
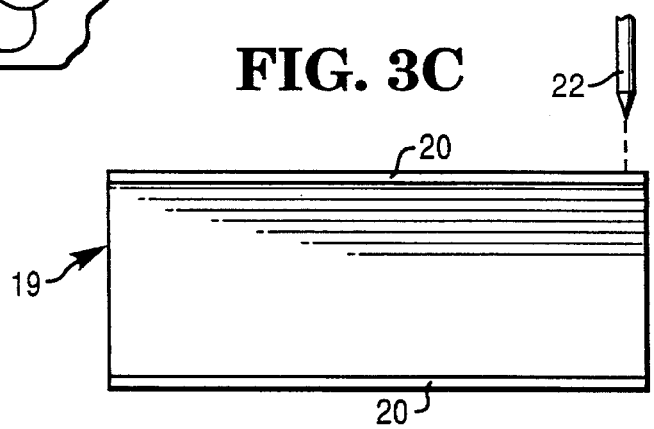
FIG. 3C
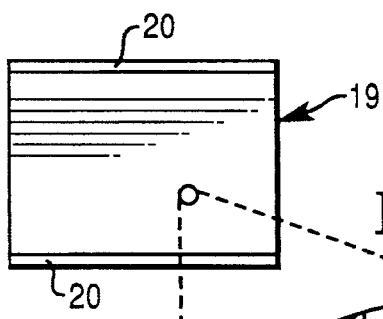
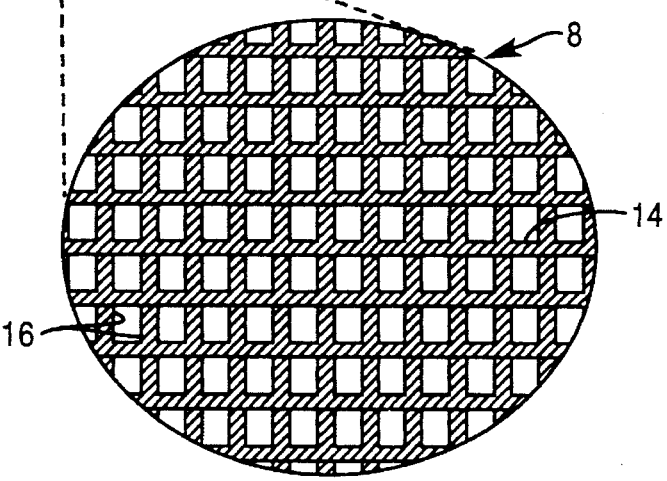
FIG. 3D
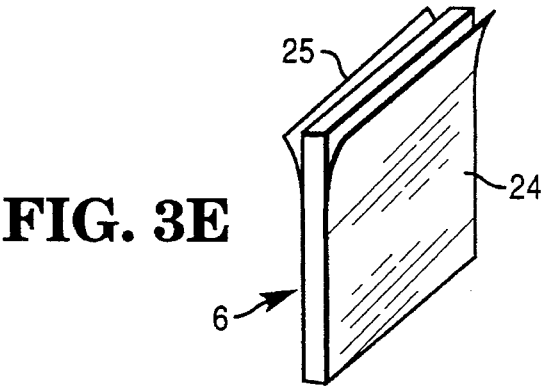
FIG. 3E

DISPLAY AND DATA ENTRY DEVICE AND METHOD FOR MANUFACTURING THE SAME

The present invention relates to display devices of the kind having a display, such as a liquid crystal display (LCD), associated with a digitizer tablet, whereby an operator can enter information into a data processor, associated with the display device, by manipulating a stylus over a surface of the display device.

BACKGROUND OF THE INVENTION

A display device of the kind specified is known from German Offenlegungsschrift No. 35 40 626. The known display device includes a digitizer tablet, above which is disposed a dot matrix type liquid crystal display unit above which is disposed a protective glass plate over which a stylus may be operated to enter information. The glass plate prevents damage to the LCD display but has the disadvantages of increased weight and of introducing parallax errors, which errors lead to difficulties in recognizing handwriting. In order to reduce parallax errors, the known device includes an electronic coordinate shifting device. This has the disadvantage of increased cost resulting from the circuit arrangements which effect coordinate shifting. Moreover, the added weight of the protective glass plate remains a disadvantage.

OBJECTS OF THE INVENTION

It is therefore an object of the present invention to provide a simple, low cost, lightweight display device of the kind specified which reduces parallax errors.

It is another object of the present invention to provide an inexpensive process for manufacturing the improved display device.

SUMMARY OF THE INVENTION

The present invention is a device having a display which provides light, and a panel which covers the display and has a plurality of channels for transmitting the light.

According to a preferred form of the present invention, the display is a dot matrix display, and the channels are in register with respective dots of the dot matrix display. The panel provides a writing surface for a stylus. A digitizer is aligned with the dot matrix display and adapted to interpret movement of the stylus across the panel. The channels are made of a plastics material, coated with a reflective material and filled with a gas.

Another form of the invention is a method of manufacturing the display panel in which elongated open channels are formed in each of a plurality of sections of plastics material. The sections are attached in a stack on top of one another so that channels in adjacent sections are aligned. Transverse sections are cut off of the stack generally normal to the open channels. The open ends of the transverse sections are then sealed with transparent sheets to form the panel.

BRIEF DESCRIPTION OF THE DRAWINGS

FIG. 1 shows a cross-sectional view of an interior portion of a display device according to a preferred embodiment of the invention.

FIG. 2 shows a view of a light transmissive panel included in the display device and an enlarged view of a portion thereof.

FIGS. 3A to 3E show manufacturing steps utilized in one method of manufacturing the light transmissive panel.

DESCRIPTION OF A PREFERRED EMBODIMENT

Figure 4:
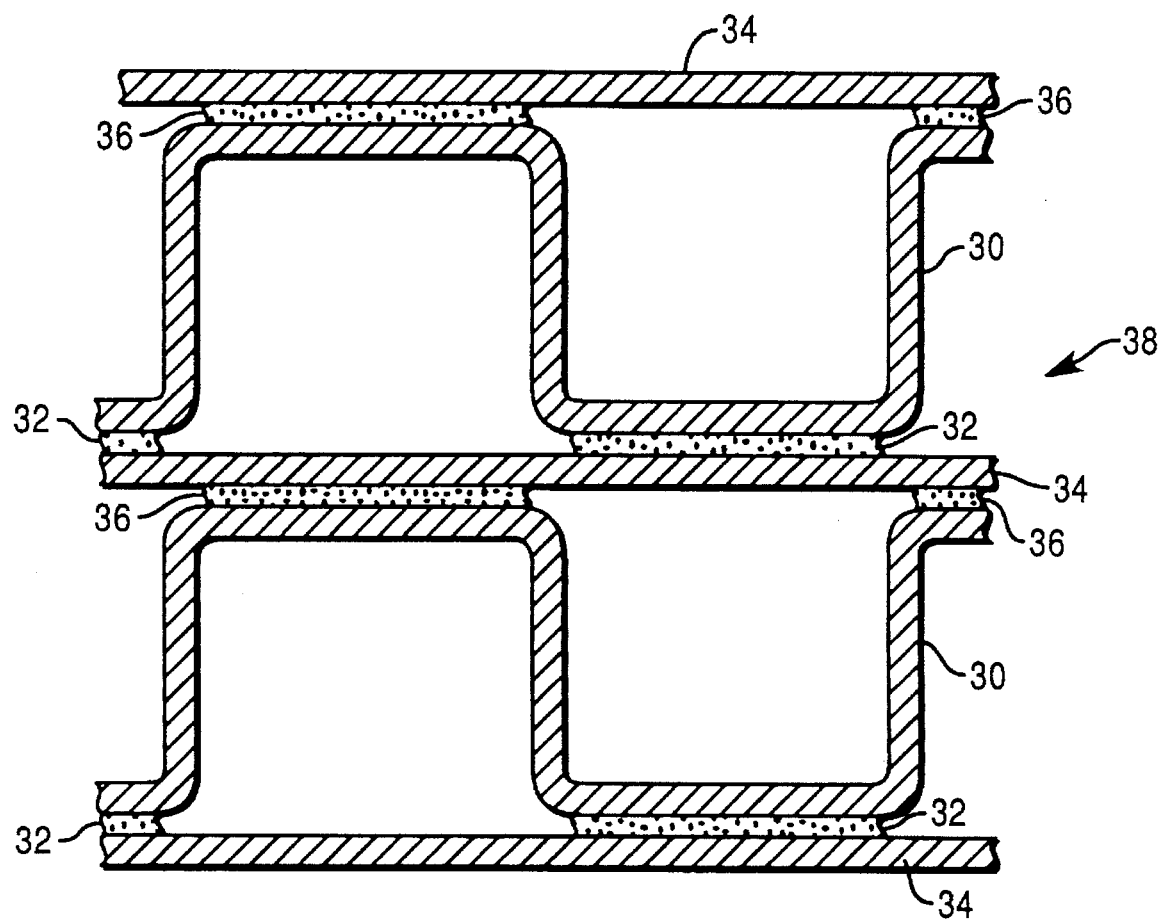
FIG. 4 shows a portion of a honeycomb structure utilized in an alternative method of manufacturing the light transmissive panel.

Referring to FIG. 1, there is shown a diagrammatic cross-sectional view of a portion of a display device 1 which includes a dot matrix display unit such as an LCD panel 2, a digitizer tablet 4 of known form and a light transmissive panel 6 mounted on the LCD panel 2. Movement of a stylus 7 over the surface of the light transmissive panel 6 is detected by the digitizer tablet 4 by electromagnetic techniques. Display device 1 can represent a number of different devices, but in a preferred form is a notepad PC (personal computer) which accepts data input by means of the stylus.

Referring to FIG. 2, the light transmissive panel 6 includes a plastics honeycomb type structure 8, including box-like apertures or channels 10. The apertures 10 contain a gaseous substance such as air and provide paths through which light can be transmitted. The sides of the channels 10 may be coated with a reflective material to improve their light reflective properties. The opposed faces of the structure 8 are sealed with respective thin transparent layers (not shown in FIG. 2). Light is provided by the LCD display 2 on a dot matrix basis and the honeycomb structure 8 is precisely positioned on the LCD display 2 so that the dots generated by the dot matrix raster are in register with the channels 10 of the honeycomb structure 8.

One method of manufacturing the light transmissive panel 6 will now be described with reference to FIGS. 3A to 3E. The first step is to mold or roll a length of a plastics material 12 into the form shown in enlarged cross-section in FIG. 3A, having elongated channels 13, with base walls 14 and side walls 16. It will be appreciated that the channels 13 will ultimately form a row of the honeycomb structure 8. In an optional step shown in FIG. 3B, the channeled plastics material 12 is coated with a reflective coating to increase the reflective properties of the channels 13. This may be done by spraying a reflective material onto the moving lengths of plastics material 12 on the top channeled surface thereof by a spraying device 18. The flat underside of the channeled plastics material, 12 is preferably also coated with reflective material, for example by a further spraying device (not shown). Next, the material 12 is cut into equal length sections and these sections are stacked on top of one another to form a stack 19 as shown in FIG. 3C and glued together with an adhesive material, with the vertical side walls 16 in vertical alignment. It will be appreciated that the underside of each section of plastics material 12 now forms the top wall of a box section as can be seen from FIG. 3D. It will further be appreciated that four hundred and eighty channeled sections will be required for a VGA (video graphics array) compatible LCD. Sheets 20 of planar (unchanneled) plastics material are affixed to the upper and lower surfaces of the structure to complete a box-like tube having a honeycomb cross-sectional structure as shown in the enlarged portion of FIG. 3D. The entire structure is subjected to pressure to complete the gluing process. Sections of the box-like tube are then sliced off by a laser 22 to give a relatively thin section of honeycomb structure. The open ends of each thin section are sealed as shown in FIG. 3E with thin transparent top and bottom plastic sheets 24, 25 or thin transparent glass sheets to complete the manufacture of the panel 6.

Alternative methods of manufacturing the panel 6 are possible. One such alternative method will now be briefly described with reference to FIG. 4, which shows an enlarged portion of a honeycomb structure manufactured by an alternative method. Firstly, a thin sheet of plastics material, which may be coated with a light reflective layer, is molded or rolled, for example by passing the coated sheet between intermeshing toothed wheels, to form a corrugated cross-sectional foil 30 as shown in FIG. 4. The raised surfaces on one side of the formed foil 30 are coated with adhesive 32 and a thin planar sheet 34 of plastics material is adhered thereto. Then, the structure consisting of the corrugated foil 30 having the planar sheet 34 adhered to one side thereof is cut into suitable equal length sections which are glued together with adhesive 36 with the corrugations in successive layers aligned, to form a stack 38, FIG. 4, similar to the stack 19 shown in FIG. 3. The stack 38 has four outer support sheets adhered to the top, bottom and two sides thereof, and is then cut into thin sections having a honeycomb structure, to which front and rear thin transparent sheets, similar to the sheets 24,25 shown in FIG. 3E, are applied.

It should be understood that modifications of the described display device construction are possible. For example, instead of an electromagnetic type digitizer tablet 4, an electrostatic type digitizer tablet may be utilized. With this construction, the digitizer tablet would preferably be located above the LCD display in a viewing direction. A thin electrostatic digitizer tablet could for example be located beneath the top transparent sealing sheet of the honeycomb structure, without substantially increasing undesired parallax effects.

The described display device has several advantages. Firstly, the use of a honeycomb structure in the protective panel leads to a construction which is very lightweight and low in cost since it is made of an inexpensive material. Parallax errors are reduced since only thin transparent sealing sheets are disposed in the light paths, as compared with the relatively thick glass protective sheet utilized in the aforementioned known device. Also, the device can be manufactured in a simple manner. Furthermore, the honeycomb structure utilized provides good mechanical stability and rigidity. Finally, with the honeycomb apertures aligned with the matrix display dots, the honeycomb structure assists in transmitting dot illumination from the light sources to the viewing surface, and separates light paths from adjacent dots.

It will be clear to those skilled in the art that the present invention is not limited to the specific embodiment disclosed and illustrated herein. It will be understood that the dimensions and proportional and structural relationships shown in the drawings are illustrated by way of example only and these illustrations are not to be taken as the actual dimensions or proportional structural relationships used in the display device of the present invention.

Numerous modifications, variations, and full and partial equivalents can be undertaken without departing from the invention as limited only by the spirit and scope of the appended claims.

What is desired to be secured by Letters Patent is as follows.

What is claimed is:

1. A light transmissive panel for use in a display comprising:

a plastics structure having a top side and a bottom side, said plastics structure including a plurality of lengths of plastic material having base walls and side walls, wherein each of said plurality of lengths of plastic material form a row of the plastics structure;

a flat length of plastic material;

wherein the plurality of lengths of plastic material are glued together with the side walls in alignment and the base walls forming the top wall of box-like apertures of the previous length of plastic material for all but the last length of plastic material and the flat length of plastic material forming the top wall of the last length of plastic material, forming the box-like apertures forming rows and columns in the plastics structure;

a reflective material coating on the sides of the box-like apertures;

a thin transparent layer secured to said top side; and a thin transparent layer secured to said bottom side.

2. A light transmissive panel for use in a display, comprising:

a plastics structure having a top side and a bottom side, said plastics structure including a plurality of corrugated lengths of plastic material having base walls and side walls, wherein each of the corrugated lengths of plastic material form a row of the plastics structure;

a plurality of flat lengths of plastic material;

wherein the plurality of flat lengths of plastic material are glued together with the plurality of corrugated lengths of plastic material wherein said side walls are in alignment and the flat lengths form the top walls of box-like apertures, forming the box-like apertures forming rows and columns in the plastics structure;

a reflective material coating on the sides of the box-like apertures;

a thin transparent layer secured to said top side; and a thin transparent layer secured to said bottom side.

\* \* \* \* \*